United States Patent [19]

Tebben

[11] 4,088,856
[45] May 9, 1978

[54] PERIMETER SAFETY SWITCH MOUNTED TO SUPPORT DISPOSED REMOTE FROM MACHINE BODY

[75] Inventor: Lloyd W. Tebben, St. Paul, Minn.

[73] Assignee: Acrometal Products, Inc., Minneapolis, Minn.

[21] Appl. No.: 701,692

[22] Filed: Jul. 1, 1976

[51] Int. Cl.[2] .......................... H01H 3/00; B23Q 5/58; F16P 3/12

[52] U.S. Cl. ............................... 200/52 R; 51/165.74; 83/DIG. 1; 90/11 R; 192/129 A; 200/61.42

[58] Field of Search ............... 200/52 R, 61.41, 61.42, 200/61.43, 61.44, 61.57, 61.58 R, 86 R, 302, 329, 330; 307/326, 328; 83/DIG. 1; 90/11 R; 408/710; 51/165.74

[56] References Cited

U.S. PATENT DOCUMENTS

| | | | |
|---|---|---|---|
| 2,244,933 | 6/1941 | Armstrong | 200/86 R |
| 2,575,926 | 11/1951 | Murray | 200/61.57 X |
| 2,796,484 | 6/1957 | Wolf | 200/61.43 X |
| 2,843,694 | 7/1958 | Bertaux | 200/86 R |
| 2,929,894 | 3/1960 | Veenstra | 200/86 R |
| 3,277,256 | 10/1966 | Jones | 200/61.43 |
| 3,315,050 | 4/1967 | Miller | 200/61.43 |
| 3,485,974 | 12/1969 | Wolf et al. | 200/61.57 |
| 3,496,317 | 2/1970 | Reed | 200/52 R |
| 3,515,824 | 6/1970 | Henson et al. | 200/52 R |
| 3,544,746 | 12/1970 | Wolf et al. | 200/86 R |
| 3,693,026 | 9/1972 | Miller | 200/61.43 X |
| 3,710,050 | 1/1973 | Richards | 200/61.43 |
| 3,876,844 | 4/1975 | Scherenberg | 200/61.57 |

OTHER PUBLICATIONS

Tapeswitch Corporation of America; Industrial Catalog C-5A; p. 1, "Uses for Controlflex".
Tapeswitch Corporation of America; Industrial Catalog C-5A; p. 2, Accessories for Tapeswitch Ribbon Switches.
Tapeswitch Corporation of America; Industrial Catalog C-5A, p. 3, "Tapeswitch Control Units, Kits and Assemblies".
Tapeswitch Corp. of America, Bulletin PE-162.
Tapeswitch Corp. of America, Bulletin CVP 371, 5-1972.
Tapeswitch Corp. of America, Bulletin CRP-1261, 5-1972.
Tapeswitch Corp. of America, Industrial User Catalog C-4, 12-70, pp. 1-6.

Primary Examiner—James R. Scott
Attorney, Agent, or Firm—Merchant, Gould, Smith, Edell, Welter & Schmidt

[57] ABSTRACT

The disclosure is directed to a perimeter safety switch for machines that require an operator. The safety switch comprises a longitudinal support member that extends around the permimeter of the machine at approximately waist level, and is spaced outwardly therefrom by a plurality of brackets. The support member carries a longitudinal switching element that is actuatable at any point over its length, and which forms part of an electrical circuit for interrupting power to the machine in response to actuation of the switch.

12 Claims, 6 Drawing Figures

PERIMETER SAFETY SWITCH MOUNTED TO SUPPORT DISPOSED REMOTE FROM MACHINE BODY

BACKGROUND OF THE INVENTION

The invention relates generally to safety apparatus for machinery requiring an operator, and specifically resides in a perimeter safety switch for such machinery which is easily accessible for quickly stopping machine operation.

Many stationary, upright machines require the presence of an operator for continuously operating the machine and supervising its operation. Many such machines require the use of both the operator's hands, which makes emergency stopping of the machine difficult and slow where conventional power switches are used. If the operator is momentarily disabled during an emergency condition, it may be virtually impossible to himself switch off the machine.

Stationary abrasive belt machines are a typical example. Such machines often employ an endless abrasive belt of substantial width passing over two or more cylindrical drums that operate at high linear speed and under significant power. They are typically used for production sanding, cross-abrading, deburring, polishing, surfacing and close tolerance machining. The endless abrasive belt operates horizontally or vertically at approximately the waist level of the operator, and is capable of continuous in-feed. Accordingly, the operator must manually feed or supervise automatic feeding of workpieces, and a second operator often receives the finished workpieces as they leave the machine.

Emergency or stop conditions for such a machine may arise for any number of reasons, among them equipment failure (motor burn-out, bearing seizure, belt breakage), the need for equipment readjustment, jamming of a workpiece within the machine, or accidental injury to an operator. Whatever the reason for the condition, it is almost always necessary to stop the machine immediately to prevent further injury to the operator, or to the equipment and workpieces. It is often difficult to stop the machine quickly, particularly where there are a plurality of operator's stations, if the machine is large, if the control switches are remote from the operator's area, or if the control switches are conventionally small in size. The problem may be compounded where human injury occurs and is accompanied by panic.

The subject invention remedies these problems with a perimeter safety switch that is accessible from any point of operation of the machine, and which can be actuated other than with the operator's hands. More specifically, the perimeter safety switch comprises a continuous longitudinal switch capable of being actuated at any point over its length, which is mounted on a bracket extending around the periphery of the machine, or at least around all areas which are accessible to the operator. The mounting bracket is disposed at approximately the waist level of the operator, and is spaced outwardly from the machine so that it is laterally beyond any other frame member or component of the machine.

Mounted in such fashion, the switch is easily accessible to the operator's hands, arms, lower torso, hips or upper legs notwithstanding the operator's normal position relative to the machine; and minimal contact with the switch by any such portion of the operator's body causes it to be immediately actuated. For example, if the operator is holding a workpiece relative to the abrasive belt with both hands when an emergency condition occurs, the machine is stopped simply by bumping it with the hip. If the operator is injured, either the operator himself or a co-worker can immediately stop the machine without searching for a switch which is remote or inaccessible, thus reducing the possibility of further injury and panic.

In addition to its improved operation, the inventive combination is structurally simple, easy to adapt to existing machines and inexpensive to install.

DESCRIPTION OF THE PREFERRED EMBODIMENT

Figure 1:
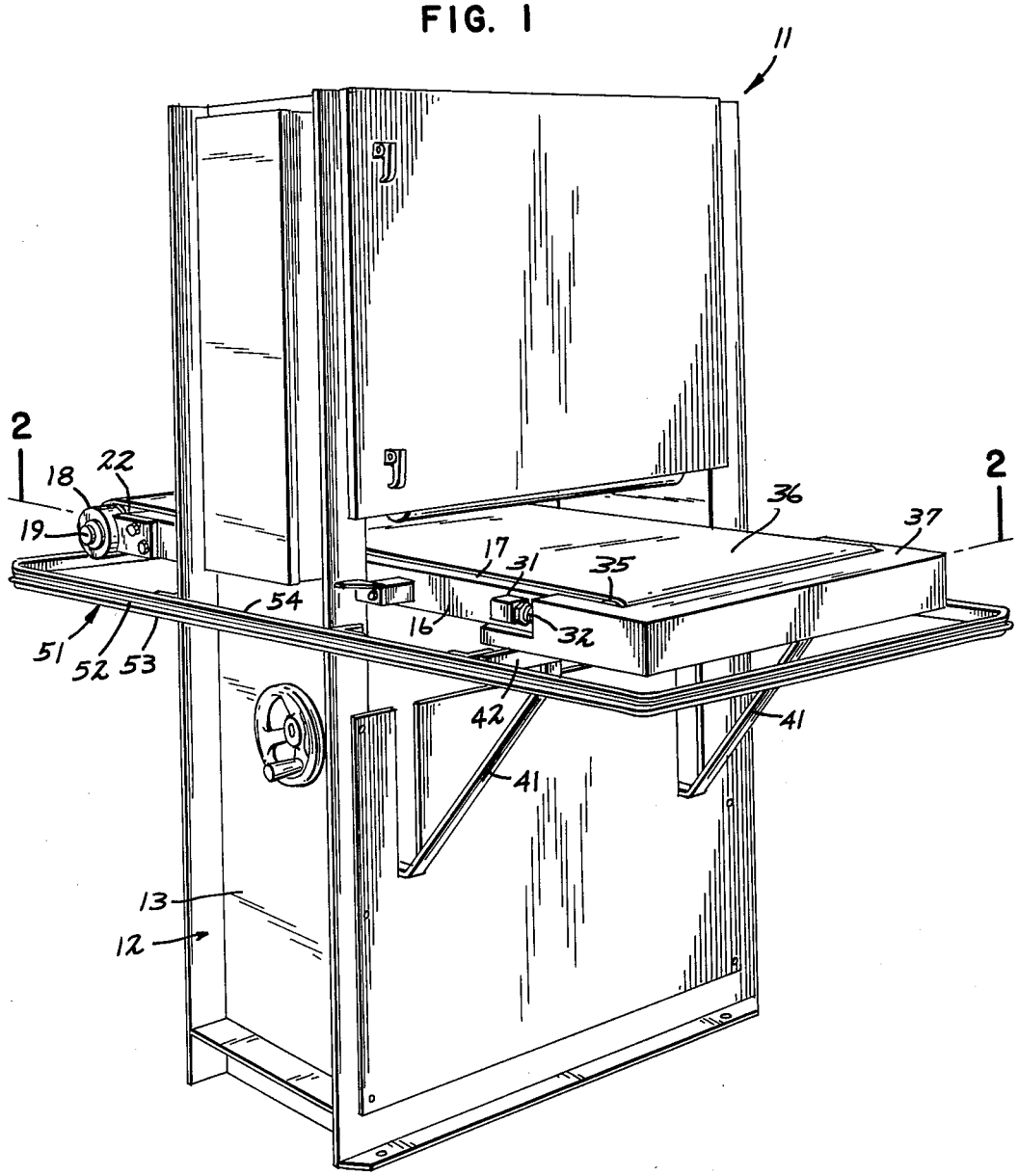
FIG. 1 is a view in perspective of apparatus embodying the inventive concept.
Figure 2:
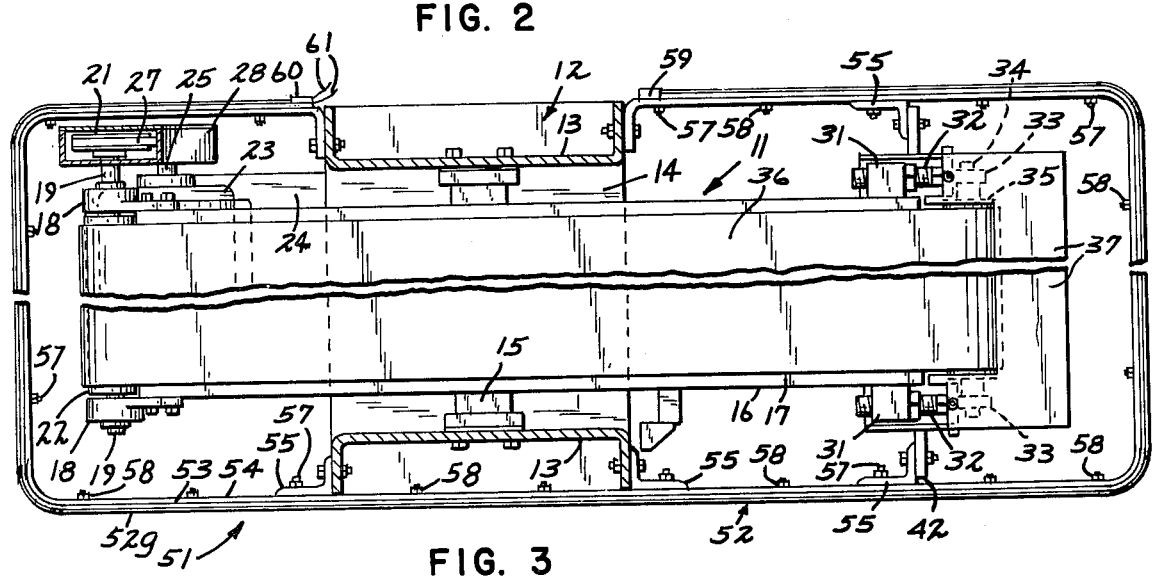
FIG. 2 is a horizontal sectional as seen from the line 2—2 of FIG. 1.
Figure 3:
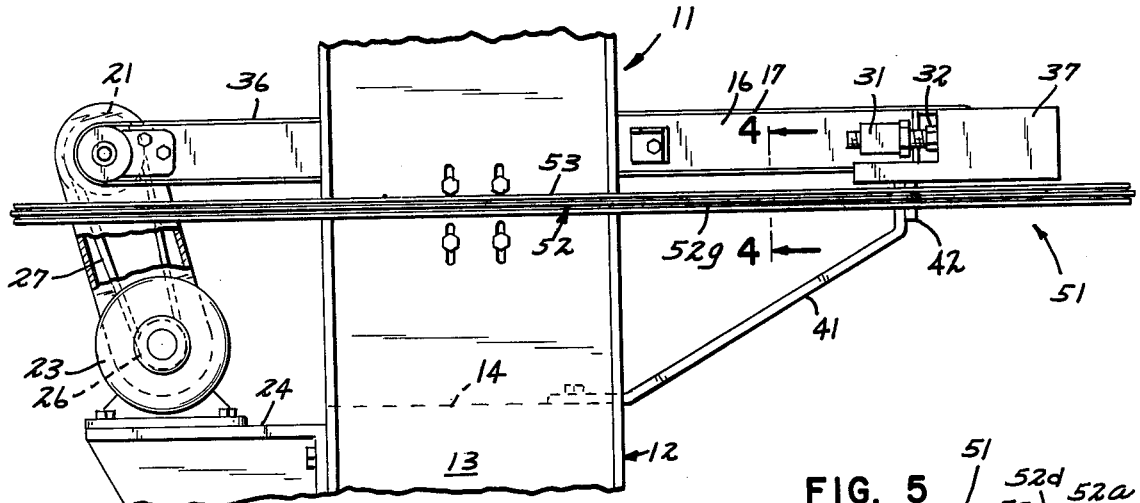
FIG. 3 is a fragmentary view of the apparatus of FIG. 2 in side elevation, portions thereof broken away and shown in section.

With initial reference to FIGS. 1-3, a machine embodying the invention perimeter safety switch is represented generally by the numeral 11. Machine 11 is exemplary of the type which may embody the invention and in the instant case is an abrasive-type machine which may be used for sanding, surfacing, machining or the like.

Machine 11 comprises a pedestal base 12 having vertical sides 13 of channeled configuration interconnected by a base plate 14. Channel sides 13 are also interconnected by a cross frame member 15 which provides support for a horizontally disposed longitudinal bed frame 16. The top surface of bed frame 16 defines a flat, rectangular platen surface 17.

A pair of bearings 18 are mounted on opposite sides of the bed frame 16 at its left end (as viewed in FIGS. 1 and 2). A shaft 19 is journaled in the bearings 18, extending laterally on one side to support a driven pulley 21. A cylindrical drum 22 is carried by and rotates with the shaft 19.

A gear head motor 23 is mounted beneath the bed frame 16 on a support plate 24 which is secured to the pedestal base 12. Motor 23 has an output shaft 25 which carries a drive pulley 26. A V-belt 27 interconnects pulleys 21, 26 to drive cylindrical drum 22. A guard 28 mounted to the bed frame 16 by brackets, not shown, extends over the pulleys 21, 26 and V-belt 27 for purposes of safety.

At the opposite end of the machine 11, a pair of ears 31 project laterally from bed frame 16. Each of the ears 31 carries a horizontally disposed axially extendable adjustment mechanism 32. A bearing 33 is mounted on each of the adjustment mechanisms 32, the bearings 33 being aligned to rotatably carry a shaft 34. A cylindrical drum 35 is rotatably mounted on the shaft 34.

Cylindrical drum 35 is aligned with the cylindrical drum 22, and an endless conveyor belt 36 is mounted around them. As shown in FIG. 3, the upper flight of conveyor belt 36 rests on and is slideably supported by the platen surface 17 to perform an abrading function on workpieces not shown. Tension of the conveyor belt 36 is determined by axial adjustment of the adjustment mechanisms 32.

A cover or shield 37 is mounted to the bed frame 16 and surrounds the cylindrical drum 35 and related moving parts, as well as portions of the conveyor belt 36 for safety purposes.

Angular supports 41 mounted to a bracket 42 carried by the underside of the bed frame 16 and supportably extending to the pedestal base 12 are used where the bed frame 16 extends significantly.

With reference to FIG. 1, an endless abrasive belt, not shown, is operably mounted within the upper head region of the machine 11. The abrasive belt is mounted for operation in a manner similar to that of the conveyor belt 36 and is also of approximately the same width. However, the endless abrasive belt is mounted perpendicularly to the conveyor belt 36, the lower portion passing around a cylindrical drum the surface of which is parallel to the upper flight of belt 36. As such, the workpiece is placed on the conveyor belt 36 at the input end and is carried under and into engagement with the abrasive belt to perform the necessary abrading operation. The conveyor belt 36 continues to carry the workpiece for discharge at the outlet end.

With reference to FIGS. 1-4, a perimeter safety switch for the machine 11 is referred to generally by the numeral 51. As shown particularly in FIG. 4, which is a cross-sectional representation, switch 51 comprises a continuous switch element 52, a carrying member 53 for the switch element 52 and a support bar 54 for the assembly.

Support bar 54 consists of a length of rigid, rectangular steel stock which is bent to generally conform to the outermost shape of machine 11, being rounded at its corners to avoid potentially dangerous edges. It may comprise a single length as shown in FIG. 1, or a plurality of individual segments. As shown in particular in FIG. 1, support bar 54 is spaced from the machine 11 by a plurality of spacing brackets 55, some of which are connected directly to the pedestal base 12 and some of which are mounted to support 42 extending laterally of the machine. It is preferable that the perimeter switch 51 be disposed outwardly of all other structural and operational members and components of the machine 11, and support bar 54 is formed and mounted to that end.

With reference to FIG. 2, carrier 53 is also rigid and channeled in cross section, having sides 53a which bend inwardly to receive and retain the switch element 52. The relative sizes of the carrier 53 and switch element 52 permit the latter to be fed into an open channel and positioned by sliding. The width or height of carrier 53 conforms to that of support bar 54, and it also has a deep recess 53b extending over its length to accommodate mounting screws 57 without interfering with the switch element 52. The mounting screws are spaced intermittently over the length of the carrier 53, mounting it to the support bar 54 with the assistance of nuts 58. Carrier 53 can be mounted to the support bar 54 by other suitable means, such as rivets.

As shown in FIG. 1, carrier 53 comprises a single length, although it could be segmented, and conforms generally to the shape and length of support bar 54.

Figure 4:
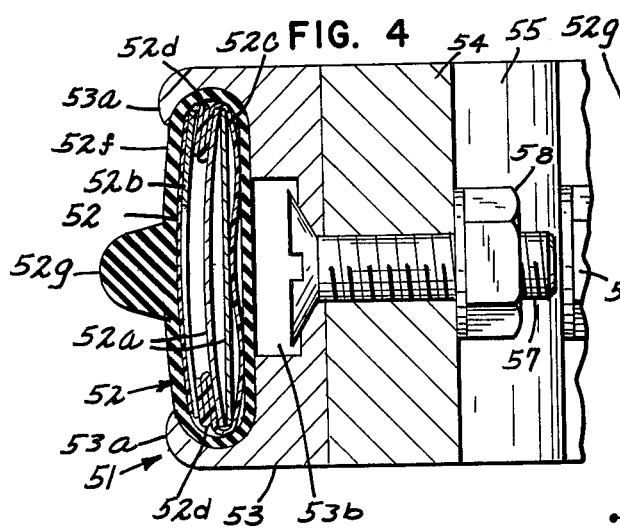
FIG. 4 is an enlarged sectional view of the perimeter safety switch taken along the lines 4—4 of FIG. 3.
Figure 5:
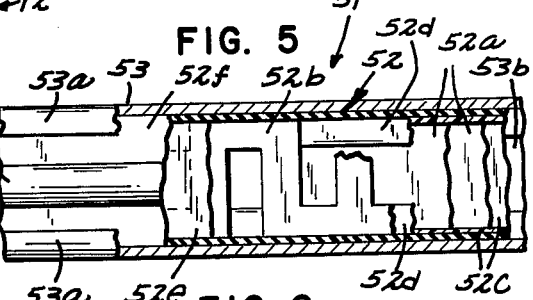
FIG. 5 is an enlarged fragmentary view of the perimeter safety switch in side elevation, portions thereof broken away and shown in section.

Switch element 52 is a single continuous length and resiliently flexible to permit it to slide into the channel of carrier member 53 over its length. With specific reference to FIGS. 4 and 5, switch element 52 comprises first and second continuous strips 52a, 52b which are electrically conductive. As shown in FIG. 4, conductor 52a itself consists of two electrically conductive strips of the same size, one of which is essentially flat and the other of which is sightly bowed. The two strips are arranged back to back with their sides in continuous electrical contact. Strip 52b is of the same width as conductor strip 52a, and, as shown in FIG. 4, takes the form of a square wave.

Conductor strips 52a, 52b are normally separated by an insulator strip 52c, which is resiliently flexible and electrically nonconductive. As shown in FIG. 3, insulating strip 52c covers the entire back side of conductor strip 52a, extending over its edges with a plurality of accordion-like folds 52d which engage the underside edges of conductor strip 52b. Since the insulating strip 53c is resiliently flexible, the accordion folds 52d normally urge the conductor strip 52a away from the conductor strip 52b so that no electrical contact is made. A second insulating strip 52e overlies the conductor strip 52b.

The components 52a-e are encased in a nonmetallic, nonelectrically conductive sheath 52f formed from resiliently flexible material. The sheath completely and protectably encircles the components 52a-e and includes a longitudinal bead 52g on its front surface which serves as a bumper.

A pair of terminals 59, 60 are respectively connected at each end of the switch element 52. Terminal 59 is a "dead end" terminal and serves only to cap the switch end and prevent exposure of the conductor strips 52a, 52b. Terminal 60 serves as an electrical connection between the switch element 52 to a voltage source through electrical leads 61.

Figure 6:
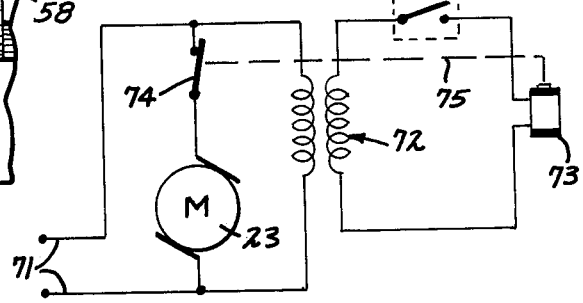
FIG. 6 is a schematic representation of a control circuit used with the apparatus.

The type of circuit switch with which the perimeter safety switch is used may vary with the application, and the circuit of FIG. 6 is typical. In the circuit, a pair of leads 71 are adapted for connection to a 120 volt source. This voltage is applied to motor 23 as well as any other electrical apparatus of the machine. The voltage is reduced by a transformer 72 to approximately 17 volts before application to the continuous switch element 52, which is represented schematically as a normally open switch in the secondary circuit. A relay 73 is connected in series with the switch 52 in the secondary circuit, and is actuated when switch 52 is closed. Relay 73 is of the type that remains in its set position even if switch 52 is subsequently opened. Relay 73 is automatically reset as soon as the switch is released.

Relay 73 includes a set of normally closed contacts 74, which appear in the primary circuit in series with the motor 23. The control of contact 74 by relay 73 is represented by a dotted line bearing the reference numeral 75.

As described, any contact between the conductor strips 52a, 52b of the switch 52 actuates the relay, which in turn opens the contact 74 to stop the machine and all other related electrical apparatus. Power is resumed only by intentionally resetting the relay.

As shown in FIG. 3, perimeter safety switch 51 surrounds the area of operation, which normally is at approximately the operator's waist level. In operation, the operator works relative to the abrasive belt 36 and its adjacent areas. If an emergency condition arises, or any other condition requiring that the machine 11 be stopped, the operator need only bump the perimeter safety switch 51 at any point along its length to stop the machine. Since the perimeter switch 51 virtually surrounds the machine 11, the operator or a third person can stop the machine from virtually any point along its periphery. Switch element 52 is extremely sensitive, and it can be actuated by touching with the hand or arm, or by bumping it with the hip or leg. Since the perimeter switch 51 is mounted outwardly of any other portion of the machine, it is the first structure contacted by a person approaching the machine. This is particularly advantageous not only for the operator but by a third person coming to the operator's assistance during emergency conditions.

What is claimed is:

1. Safety apparatus for an electrical machine requiring an operator and having a predetermined periphery, comprising:
   a. a longitudinal support member generally conforming in shape to the periphery of the machine;
   b. longitudinal switch means actuatable at any point over its length, the longitudinal switch means conforming generally in length to the longitudinal support member and mounted thereto;
   c. means for mounting the longitudinal support member to the machine in spaced relation to the machine periphery and outwardly remote therefrom in a position which permits unobstructed operator accessibility to the switching means;
   d. and electrical circuit means for interrupting electrical power to the machine in response to actuation of the longitudinal switch means.

2. The safety apparatus defined by claim 1, wherein the mounting means is constructed and arranged to space the longitudinal support members and longitudinal switch means outwardly of all other structure of the machine.

3. The safety apparatus defined by claim 1, wherein the longitudinal switch means is normally open, and the circuit means comprises:
   a. relay means;
   b. and normally closed contact means operable by the relay means for controlling the supply of electrical power to the machine;
   c. the relay means being operable upon closure of the normally open longitudinal switch means to open the contact means and thereby interrupt electrical power to the machine.

4. The safety apparatus defined by claim 1, wherein the longitudinal support member is formed from rigid bar stock.

5. The safety apparatus defined by claim 4, wherein the longitudinal support member comprises a single length of said rigid bar stock, the length being bent to conform to the machine periphery.

6. The safety apparatus defined by claim 1, wherein the longitudinal support member is mounted essentially horizontally at approximately waist level.

7. The safety apparatus defined by claim 1, wherein the longitudinal switch means is resiliently flexible.

8. The safety apparatus defined by claim 1, wherein the mounting means comprises a plurality of brackets.

9. The safety apparatus defined by claim 1, wherein the longitudinal switch means is generally flat and is carried by a longitudinal rigid channel member secured to the longitudinal support member.

10. The safety apparatus defined by claim 1, wherein the mounting means substantially surrounds the machine periphery.

11. Safety apparatus for an electrical machine requiring an operator and having a predetermined periphery, comprising:
    a. a rigid, longitudinal support bar bent in general conformance to and dimensionally larger than the periphery of the machine;
    b. a resiliently flexible, longitudinal switching device having normally open contacts constructed and arranged to be closed at any point over the length of the switching device, said switching device being mounted on and supported by the rigid support bar;
    c. bracket means for mounting the longitudinal support bar to the machine in spaced relation to the machine periphery and outwardly remote from said periphery and all other structure of the machine, said longitudinal support bar being disposed essentially horizontally and in a position which permits unobstucted operator accessibility to the switching means;
    d. and an electrical circuit including the longitudinal switching means and further comprising
       1. a relay; and
       2. normally closed contacts operable by the relay and disposed within the electrical circuit to control the supply of electrical power to the machine;
       3. the relay being operable in response to closure of the normally open contacts of the switching device to open said normally closed contacts and thereby interrupt the supply of electrical power to the machine.

12. The safety apparatus defined by claim 11, wherein the mounting means substantially surrounds the machine periphery.

* * * * *